United States Patent
Xu et al.

(10) Patent No.: US 12,088,348 B1
(45) Date of Patent: *Sep. 10, 2024

(54) SYSTEMS AND METHODS FOR POWER AND MODULATION MANAGEMENT

(71) Applicant: Cable Television Laboratories, Inc., Louisville, CO (US)

(72) Inventors: Mu Xu, Broomfield, CO (US); Zhensheng Jia, Superior, CO (US); Luis Alberto Campos, Superior, CO (US); Chris Stengrim, Wilton, CT (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,361

(22) Filed: Jul. 10, 2023

Related U.S. Application Data

(62) Division of application No. 17/937,677, filed on Oct. 3, 2022, now Pat. No. 11,700,065, which is a division of application No. 17/453,480, filed on Nov. 3, 2021, now Pat. No. 11,539,442.

(60) Provisional application No. 63/109,240, filed on Nov. 3, 2020.

(51) Int. Cl.
| | | |
|---|---|---|
| *H04B 10/564* | (2013.01) | |
| *H04B 10/50* | (2013.01) | |
| *H04B 10/54* | (2013.01) | |
| *H04B 10/25* | (2013.01) | |

(52) U.S. Cl.
CPC ......... *H04B 10/541* (2013.01); *H04B 10/504* (2013.01); *H04B 10/25* (2013.01); *H04B 10/564* (2013.01)

(58) Field of Classification Search
None
See application file for complete search history.

(56) References Cited

U.S. PATENT DOCUMENTS

| | | | | |
|---|---|---|---|---|
| 7,522,671 B2 * | 4/2009 | Kiamilev | ............ | H04W 52/20 455/127.1 |
| 8,315,332 B2 * | 11/2012 | Hardacker | ............ | H04L 5/1446 375/267 |
| 8,660,070 B2 * | 2/2014 | Miki | ............ | H04L 5/0053 455/418 |

(Continued)

OTHER PUBLICATIONS

Yoo et al., Intra and Inter Datacenter Networking: The Role of Optical Packet Switching and Flexible Bandwidth Optical Networking, 2012 (Year: 2012).*

Primary Examiner — Jai M Lee
(74) Attorney, Agent, or Firm — PdZ Patent Law, PLLC

(57) ABSTRACT

A method for automatic power and modulation management in a communication network includes (a) generating a discontinuous management function that is a weighted function of at least spectral efficiency and power consumption of the communication network, (b) determining, from the discontinuous management function, an optimal modulation format, an optimal forward error correction (FEC) rate, and an optimal output power of a transmitter of the communication network, which collectively achieve a maximum value of the management function, and (c) causing the transmitter to operate according to the optimal modulation format, the optimal FEC rate, and the optimal output power.

20 Claims, 12 Drawing Sheets

(56) References Cited

U.S. PATENT DOCUMENTS

| | | | |
|---|---|---|---|
| 9,294,216 B2 * | 3/2016 | Lowery | H04L 5/0046 |
| 9,692,624 B2 * | 6/2017 | Kolze | H04L 1/0003 |
| 10,257,789 B2 * | 4/2019 | Delgado | H04W 52/225 |
| 10,389,473 B1 | 8/2019 | Vassilieva et al. | |
| 10,700,807 B1 * | 6/2020 | Vassilieva | H04J 14/06 |
| 11,539,442 B1 * | 12/2022 | Xu | H04B 10/541 |
| 2019/0305854 A1 * | 10/2019 | Campos | H04B 10/614 |

* cited by examiner ically enjoy
SYSTEMS AND METHODS FOR POWER AND MODULATION MANAGEMENT

CROSS REFERENCE TO RELATED APPLICATIONS

This application is a divisional of U.S. patent application Ser. No. 17/937,677, filed on Oct. 3, 2022, which is a divisional of U.S. patent application Ser. No. 17/453,480, filed on Nov. 3, 3021, now U.S. Pat. No. 11,539,442, which claims the benefit of priority to U.S. Provisional Patent Application No. 63/109,240, filed on Nov. 3, 2020. Each of the aforementioned patent applications is incorporated herein by reference.

BACKGROUND

Communication infrastructure, such as access communication networks, long distance transmission communication networks, and data centers, may consume significant energy. For example, a typical access communication network has many nodes distributed over its service area, and these nodes collectively consume a significant amount of energy. Accordingly, there is great interest in minimizing energy consumption of access communication networks and other communication infrastructure.

Use of coherent optical technology in an optical communication network offers significant advantages. For example, coherent optical technology can be used to support additional end users in a point-to-multipoint communication network, as well as to enable significantly higher data rates and network capacity, relative to a conventional intensity modulated directly detected (IM-DD) optical communication network. However, coherent optical technology may require significant energy to perform complex digital signal processing algorithms and to maintain a high signal-to-noise ratio (SNR) when operating at a high-order modulation format and at a high coding rate. Thus, improving the energy efficiency of coherent system is of great importance.

DETAILED DESCRIPTION OF THE EMBODIMENTS

Coherent optical communication networks typically enjoy greater receiver sensitivity than conventional intensity modulated directly detected (IM-DD) communication networks. Consequently, a coherent optical point-to-multipoint communication network may be capable of serving a large area including diverse groups of end users, such as end users in each of dense urban areas, suburban areas, and rural areas. These different groups of end users may experience significantly different transmission distances and path losses, and the end users may be assigned widely varying power budgets. Additionally, service requirements, such as capacity, latency, reliability, and/or quality of service (QOS), may significantly vary among the different groups of end user. Accordingly, communication network requirements and power budgets are anticipated to significantly vary among end users in a large coherent optical communication network. Conventional coherent optical communication networks, however, operate with a fixed modulation format and a fixed forward error correction (FEC) rate, and conventional coherent optical communication networks therefore cannot be optimized for a diverse group of end users. Consequently, significant spectral resources and power may be wasted when serving a large area to ensure that all end users receive satisfactory service.

Disclosed herein are systems and methods for power and modulation management which at least partially overcome the above-discussed drawbacks of conventional communication networks. The new systems and methods advantageously automatically control and manage network transmission power, as well as modulation modes and/or FEC modes, to dynamically distribute communication network spectral resources to end users according to their respective power budgets and/or QoS requirements. Additionally, certain embodiments achieve a balance between power consumption and spectral efficiency by using a management function, e.g., an economic function, to relate power consumption to mutual information per symbol (MIPS), where MIPS specifies a maximum amount of information carried by each symbol (e.g., in bits/symbol) in a communication network. Particular embodiments of the management function are computationally efficient and are therefore conducive to implementing in low-cost integrated circuits, such as in application specific integrated circuits (ASICs).

Figure 1:
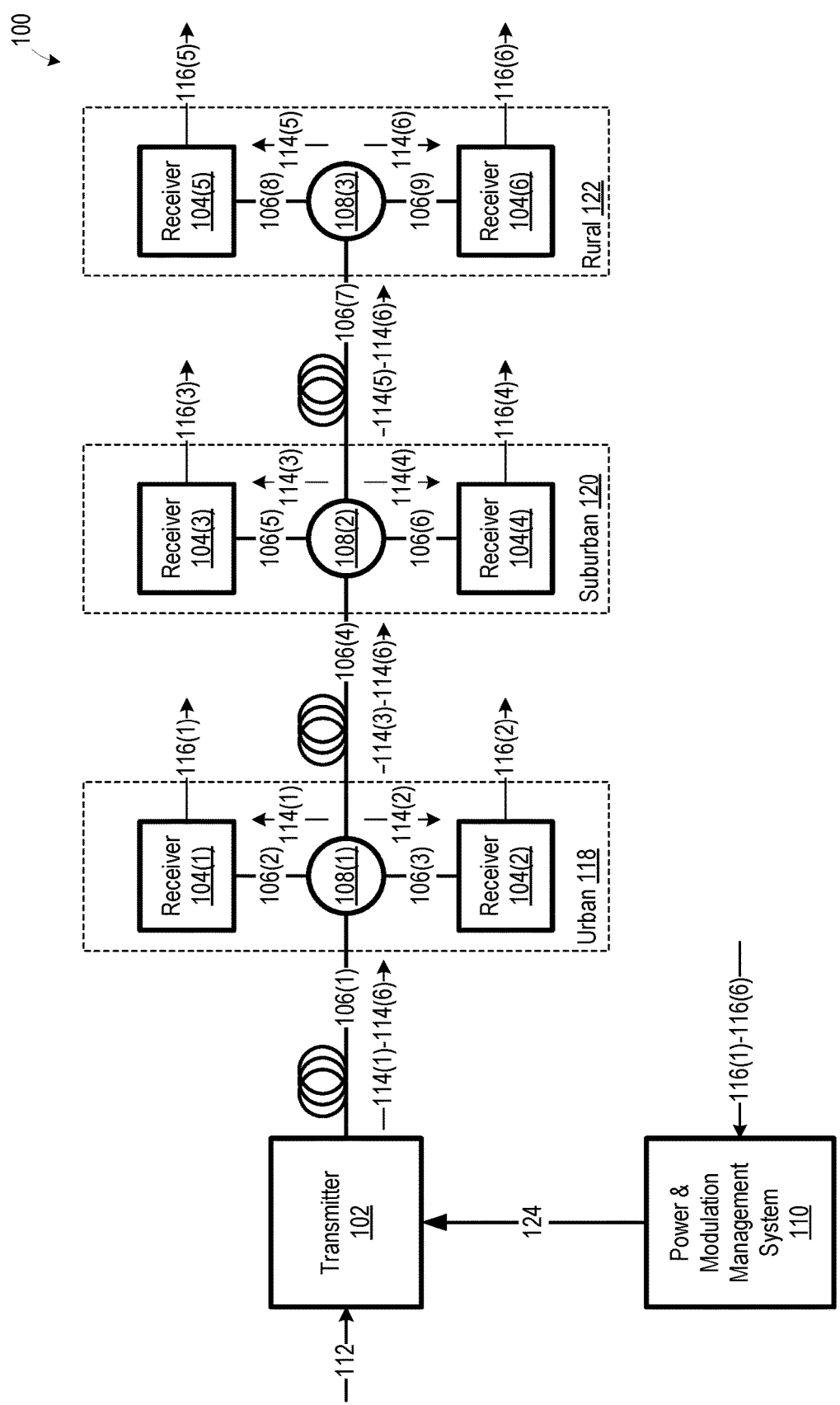
FIG. 1 is a block diagram of a communication network including a power and modulation management system, according to an embodiment.

FIG. 1 is a block diagram of a communication network 100 including a transmitter 102, a plurality of receivers 104, optical cables 106, optical splitters 108, and a power and modulation management system 110. In this document, specific instances of an item may be referred to by use of a numeral in parentheses (e.g., receiver 104(1)) while numerals without parentheses refer to any such item (e.g., receivers 104). Power and modulation management system 110, discussed further below, is one embodiment of the new systems for power and modulation management disclosed herein. Transmitter 102 is configured to generate respective transmission communication signals 114(1)-114(6) for each receiver 104(1)-104(6), in response to input communication signals 112. For example, transmitter 102 generates transmission communication signals 114(1) for receiver 104(1), and transmitter 102 generates transmission communication signals 114(2) for receiver 104(2), in response to input communication signals 112. In some embodiments, input communication signals 112 are in an electrical domain or a wireless domain, and transmitter 102 is configured to convert input communication signals 112 from the electrical or wireless domain to transmission communication signals 114 in the optical domain.

Optical cables 106 and optical splitters 108 are collectively configured to transmit transmission communication signals 114 from transmitter 102 to corresponding receivers 104. For example, optical cables 106 and optical splitter 108 collectively transmit transmission communication signals 114(1) from transmitter 102 to receiver 104(1), and optical cables 106 and optical splitters 108 collectively transmit transmission communication signals 114(5) from transmitter 102 to receiver 104(5). Optical cable 106(1) communicatively couples optical splitter 108(1) to transmitter 102, and optical splitter 108(1) communicatively couples each of optical cables 106(2)-106(4) to optical cable 106(1). Optical cables 106(2) and 106(3) communicatively couple receivers 104(1) and 104(2) to optical splitter 108(1), respectively. Optical cable 106(4) communicatively couples optical splitter 108(2) to optical splitter 108(1), and optical splitter 108(2) communicatively couples each of optical cables 106(5)-106(7) to optical cable 106(4). Optical cables 106(5) and 106(6) communicatively couple receivers 104(3) and 104(4) to optical splitter 108(2), respectively. Optical cable 106(7) communicatively couples optical splitter 108(3) to optical splitter 108(2), and optical splitter 108(3) communicatively couples each of optical cables 106(8) and 106(9) to optical cable 106(7). Optical cables 106(8) and 106(9) communicatively couple receivers 104(5) and 104(6) to optical splitter 108(3), respectively.

Each receiver 104 is configured to generate respective output communication signals 116 from respective transmission communication signals 114. For example, receiver 104(1) is configured to generate output communication signals 116(1) from transmission communication signals 114(1), and receiver 104(4) is configured to generate output communication signals 116(4) from transmission communication signals 114(4). In some embodiments, output communication signals 116 are in an electrical domain or a wireless domain, and each receiver 104 accordingly converts transmission communication signals from the optical domain to the electrical domain or to the wireless domain. Some embodiments of communication network 100 are configured to use coherent optical technology, such as to help achieve high network capacity and/or serve a large number of end users. Additionally, particular embodiments of communication network 100 are configured to implement one or more of the following modulation formats: (a) a quadrature phase shift keying (QPSK) modulation format, (b) a quadrature amplitude modulation (QAM) modulation format, (c) a probabilistically-shaped QAM modulation format, and (d) a geometrically-shaped QAM modulation format. Information on probabilistically-shaped QAM and geometrically-shaped QAM modulation formats may be found, for example, in Z. Qu and I. B. Djordjevic, "On the Probabilistic Shaping and Geometric Shaping in Optical Communication Systems," IEEE Access, vol. 7, pp. 21454-21464, 2019, doi: 10.1109/ACCESS.2019.2897381. It is understood, however, that communication network 100 could be configured to implement alternative and/or additional modulation formats without departing from the scope hereof.

In certain embodiments, one or more of receivers 104 are incorporated with, or associated with, an optical network unit (ONU), an optical network termination (ONT), a premises gateway, a wireless base station (e.g., a cellular wireless base station and/or a Wi-Fi wireless base station), a satellite ground station, a fiber node, a remote terminal, a digital subscriber line access multiplexer (DSLAM), a communication hub, a communication node, a headend, a central office, a data center, a server, a switch, a router, a data storage device, an information technology device rack or cabinet, an infrastructure device, or an entertainment device. Each receiver 104 need not have the same configuration. For example, receiver 104(1) could incorporated with an ONT while receiver 104(2) could incorporated with a wireless base station.

Receivers 104(1) and 104(2) are located in an urban area 118, receivers 104(3) and 104(4) are located in a suburban area 120, and receivers 104(5) and 104(6) are located in a rural area 122. Accordingly, receivers 104(1)-104(6) may have significantly differing service requirements and power budgets. However, certain embodiments of power modulation and management system 110 are advantageously configured to control transmitter 102 via control signals 124 to help achieve an optimum operating condition of communication network 100 that provides needed communication resources to each receiver 104 while balancing competing spectral efficiency and energy efficiency interests, as discussed below.

Changes may be made to communication network 100 without departing from the scope hereof. For example, the number of receivers 104, optical cables 106, and/or optical splitters 108, may vary. Additionally, the topology of communication network 100 may be modified, and one or more optical cables 106 may be replaced with, or supplement by, another optical transmission medium, such as free space optics. Furthermore, while communication network 100 has a point-to-multipoint topology, communication network 100 could be modified to have a point-to-point topology, such as disclosed below with respect to FIGS. 11-14. Additionally, although receivers 104 are distributed among urban 118, suburban 120, and rural 122 areas, receivers 104 could have a different distribution. For example, in some alternate embodiments, all receivers 104 are disposed in a common area, such as in a common neighborhood or even in a common building. Moreover, the concepts disclosed herein are not limited to optical communication networks but could also be applied to other communication network types, such as electrical communication networks, wireless communication networks, and hybrid communication networks, such as discussed below with respect to FIGS. 15 and 16.

Referring again to FIG. 1, power and modulation management system 110 is configured to generate control signals 124 to control transmitter 102 according to a management function, e.g., an economic function, relating power consumption and MIPS of communication network 100. In certain embodiments, control signals 124 specify one or more of output power of transmitter 102, modulation format of transmitter 102, and FEC rate of transmitter 102, such that a value of a management function, an economic function, is maximized. The following is a theoretical discussion to assist a reader in understanding the context of system 110. However, it is understood that power modulation and management system 110 is not constrained to operating according to the discussed theory.

Theory

According to Shannon theory, MIPS is given by EQN. 1 below, where C is total capacity, B is signal occupied bandwidth (e.g., Baud rate under Nyquist sampling), P is signal power, and $N_0$ is a noise floor.

$$MIPS = \frac{C}{B} = \log_2\left(1 + \frac{P}{N_0}\right) \quad \text{(EQN. 1)}$$

EQN. 1 indicates that network power requirements increase with increasing spectral efficiency. For example, assume a scenario where a 12-bit information stream is to be transmitted at a Baud rate of B symbols/second using either a QPSK modulation format or a 16-QAM modulation format. The QPSK symbols have a normalized amplitude of A and a MIPS of 2 bits/symbol, while the 16-QAM symbols have a normalized amplitude of 2A and a MIPS of 4 bits/symbol. Consequently, six QPSK symbols are required to transmit the 12-bit information stream while only three 16-QAM symbols are required to transmit the 12-bit information stream, due to different respective MIPS values of the two modulation modes. Assuming that each QPSK symbol and each 16-QAM symbol has a period of T, 6BT of time-frequency resources are required to transmit the 12-bit information stream using QPSK modulation, while only 3BT of time-frequency resources are required to transmit the 12-bit information stream using 16-QAM modulation. However, 16-QAM modulation format consumes significantly more energy than QPSK modulation format.

Specifically, energy consumption associated with use of the QPSK modulation format is estimated by EQN. 2 below, and energy consumption associated with use of the 16-QAM modulation is estimated by EQN. 3 below. As evident from a comparison of EQNS. 2 and 3, use of the 16-QAM modulation format instead of the QPSK modulation format doubles energy consumption.

$$\text{Energy Consumption} = 0.5(A)^2 6T = 3A^2 T \quad \text{(EQN.2)}$$

$$\text{Energy Consumption} = 0.5(2A)^2 3T = 6A^2 T \quad \text{(EQN.3)}$$

Thus, there is a tradeoff between spectral efficiency and energy efficiency. Increasing spectral efficiency decreases energy efficiency, while increasing energy efficiency decreases spectral efficiency.

EQN. 1 assumes that the associated communication network operates in an error-free manner and does not implement FEC. Realistic communication networks, however, experience errors, and communication networks therefore typically implement FEC. Use of FEC will reduce the MIPS value determined by EQN. 1 as a function of the FEC rate. For example, use of RS (255,233) Reed Solmon FEC achieves a coding rate of 223/255=0.875. Consequently, while ideal QPSK, 16-QAM, and 64-QAM modulation formats have respective MIPS values of 2 bits/symbol, 4 bits/symbol, and 6 bits/symbol, actual MIPS values of the modulation formats are only 1.75 bits/symbol, 3.50 bits/symbol, and 5.25 bits/symbol, respectively, when used with RS (255,233) FEC.

Economic Function

As discussed above, there is a tradeoff between spectral efficiency and energy efficiency in a communication network. Additionally, spectral efficiency and energy efficiency have economic aspects. For example, high spectral efficiency helps a communication network operator maximize throughput of the communication network, thereby helping the operator realize maximum revenue from the communication network. As another example, high energy efficiency helps minimize energy costs associated with operating the communication network. Applicant has found that a balance between spectral efficiency and energy efficiency can be achieved by (a) generating a management function that relates an economic value to a weighted average of spectral efficiency and energy efficiency and (b) operating a communication network in a manner that at least substantially maximizes the economic value.

Accordingly, some embodiments of power and modulation management system 110 (FIG. 1) are configured to (a) generate an economic function that relates an economic value to a weighted average of spectral efficiency and energy efficiency and (b) control transmitter 102 via control signals 124 to cause the transmitter to operate in a manner which at least substantially maximizes the economic value. It is understood, however, that the functions disclosed herein may include parameters that do not necessarily have direct (or even indirect) economic character. Accordingly, the economic functions disclosed herein may also be referred to as management functions.

EQN. 4 below is one example of an economic function, where E is an economic value, b is short for MIPS, G is an optical link gain, P is an output power of transmitter 102, and w is weight ranging from zero to one. The letter i in EQN. 4 is an index ranging from 1 to N, where i represents a particular receiver 104 and N is total number of receivers 104 in the communication network.

$$E(P, b) = \left[(1-w)\sum_{i=1}^{N} b_i - w\sum_{i=1}^{N} G_i P_i / b_i\right] \quad \text{(EQN. 4)}$$

The first summation term in EQN. 4 represents spectral efficiency, and the second summation term in EQN. 4 represents energy consumption per unit of information transmitted. Accordingly, the value of w determines relative weight given to spectral efficiency and energy efficiency. As discussed above, w may range from zero to one. At one extreme where w is zero, E is solely a function of spectral efficiency, and at the other extreme where w is one, E is solely a function of energy efficiency. While not required, it is anticipated that w will typically be somewhere between zero and one. That actual value of w is implementation dependent, and w is determined, for example, according to a desired relative weighting of spectral efficiency and energy efficiency. For example, in applications where energy is particularly costly, w may be relatively large to emphasize energy efficiency in the EQN. 4 economic function. As another example, in applications where it is particularly important to use communication network capacity efficiently, w may be relatively small to emphasize spectral efficiency in the EQN. 4 economic function. Possible factors that may include selection of w include, but are not limited to, transmission distance, transmission communication signal split ratio, quality of service requirements, energy costs, and operational expenditure targets.

Optimal operation of communication network 100 can be achieved at a given optical link gain G and a given weight w by determining values of $P_i$ and $b_i$ which maximize the EQN. 4 economic value E. It should be noted that one or more parameters of EQN. 4 may be subject to constraints, thereby potentially limiting possible operating states of communication network 100 and corresponding economic values E. For example, transmitter 102 and/or one or more receivers 104 may have maximum power constraints and/or maximum MIPS value constraints. As another example, communication network 100 may have a maximum total power constraint. Additionally, maximum achievable values of $b_i$ may be constrained by use of FEC. However, FEC rate may advantageously be varied to help achieve an optimal value of $b_i$ when the optimal value cannot be achieved solely by varying modulation format and transmitter power. In particular, $b_i$ is a function of modulation format, FEC rate, and transmitter 102 power, and a large number of possible values of $b_i$ can therefore potentially be achieved even when only a relatively small number of modulation formats and FEC rates are implemented. Additionally, non-integer values of $b_i$ can be obtained by varying modulation format, FEC rate, and transmitter 102 power.

EQN. 4 may require extensive computational resources to evaluate, i.e., to determine what combination of implemented transmitter 102 power values, modulation formats, and FEC rates, achieves the highest value of E. While the number of variables in EQN. 4 can be reduced by relating $b_i$ to $p_i$, such relationship is complex and would also require significant computational resources to evaluate. Therefore, some embodiments of power and modulation management subsystem 110 are configured to evaluate an alternative, e.g., simplified, version of EQN. 4 to determine what combination of implemented transmitter 102 power values, modulation formats, and FEC rates, achieves the highest economic value. Discussed below are examples of possible simplified variations of EQN. 4 that may be evaluated by power and modulation management system 110. However, power and modulation management system 110 is not limited to evaluating these example simplified economic functions. To the contrary, power and modulation management system 110 could be configured to evaluate essentially any economic function and determine what combination of implemented transmitter 102 power values, modulation formats, and FEC rates, achieves the highest economic value.

Figure 2:
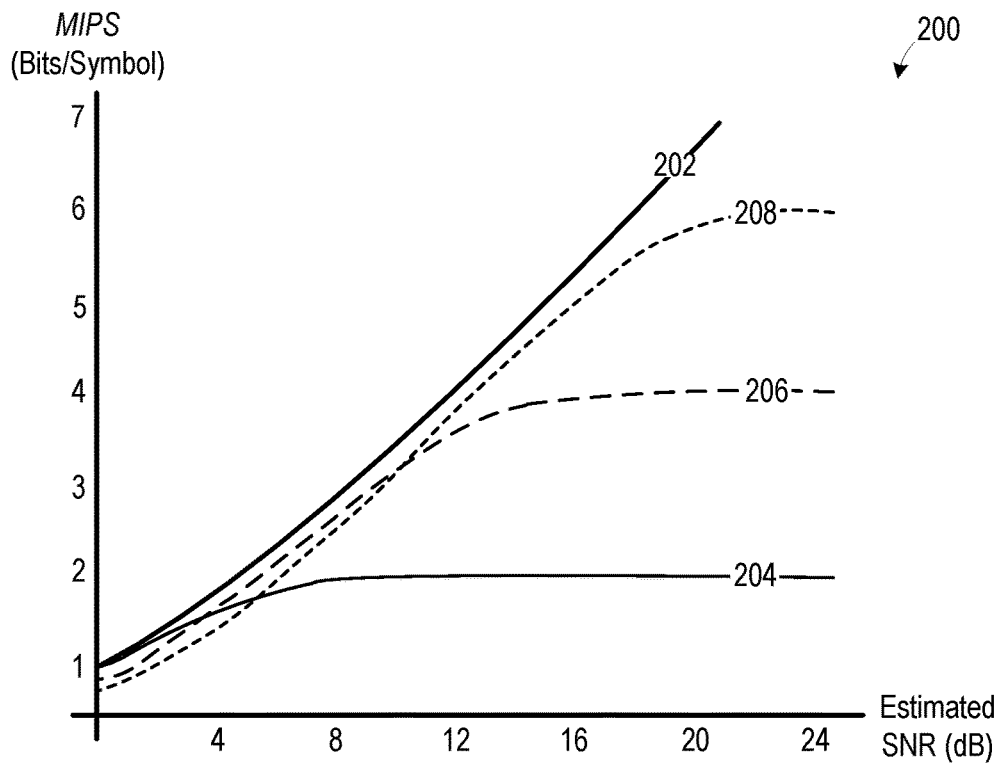
FIG. 2 is a graph of calculated mutual information per symbol (MIPS) versus signal-to-noise ratio (SNR).

FIG. 2 is a graph 200 of calculated MIPS versus estimated signal-to-noise ratio (SNR), and FIG. 2 includes curves 202, 204, 206, and 208. Curve 202 corresponds to Shannon theory, curve 204 corresponds to QPSK modulation, curve 206 corresponds to 16-QAM modulation, and curve 208 corresponds to 64-QAM modulation. As evident from FIG. 2, each depicted modulation format approximately follows Shannon theory at lower SNR values, although each modulation format plateaus at higher SNR values. Curve 202 is calculated using EQN. 1, and curves 204, 206, and 208 are calculated using an equation (not shown) for estimating MIPS.

Figure 3:
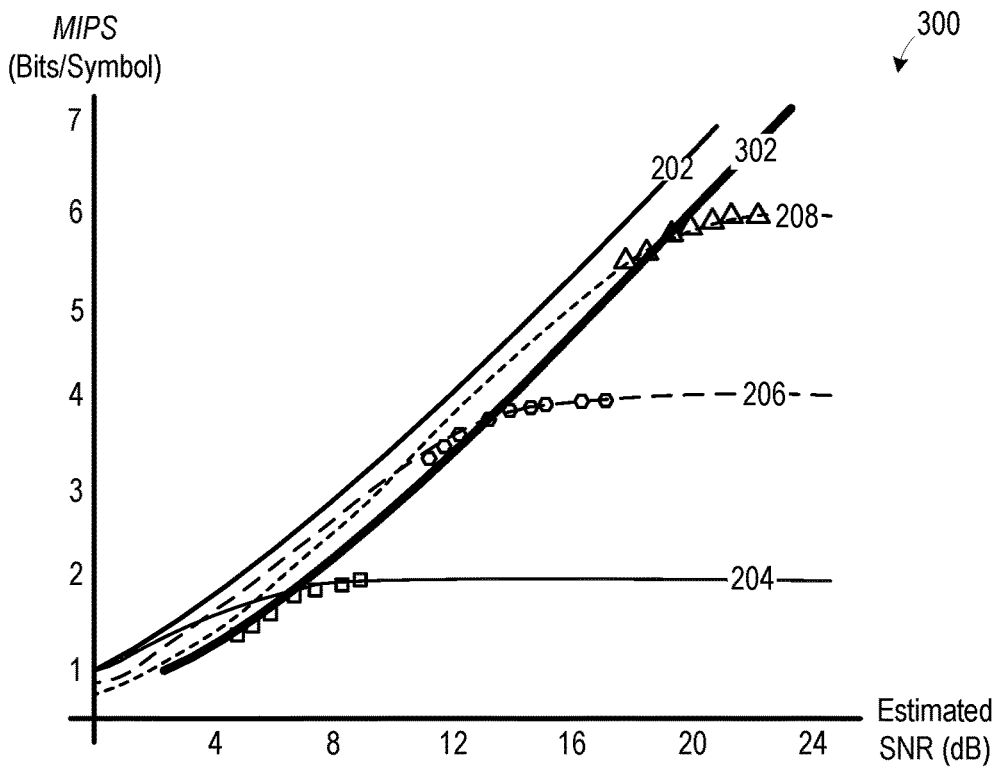
FIG. 3 is a graph of MIPS versus SNR including both calculated data and measured performance data.

FIG. 3 is a graph 300 of MIPS versus SNR. Graph 300 includes the same curves as graph 200 as well as experimental performance data of a sample communication network. The squares of graph 300 represent measured performance with QPSK modulation, and the hexagons of graph 300 represent measured performance with 16-QAM modulation. Additionally, the triangles of graph 300 represent measured performance with 64-QAM modulation. As evident from FIG. 3, the measured performance largely tracks the calculated curves. An additional curve 302, referred to as the relaxed MIPS limit (RML), is also plotted in graph 300. The RML approximates the best achievable MIPS at a given SNR under actual operating conditions of the sample communication network. RML curve 302 is similar to Shannon theory curve 202, but RML 302 curve has lower MIPS values than Shannon theory curve 202 due to the inability to achieve theoretical maximum MIPS values in a real word communication network.

RML can be calculated using EQN. 5 below, where k is an implementation-penalty coefficient and $\alpha$ is a loss function of a communication link. The RML determined from EQN. 5 approximately describes communication network performance limitations, and EQN. 5 can accordingly be used to help simplify EQN. 4.

$$RML = \log_2\left(1 + \frac{k\alpha GP}{N_0}\right) \quad \text{(EQN. 5)}$$

For example, assume that receivers 104 of communication network 100 operate independently. EQN. 2 can be adapted to determine an economic value E for a single receiver 104, as shown in EQN. 6 below. Additionally, EQN. 5 can be substituted into EQN. 6 in place of b to yield EQN. 7 below. P is divided by $N_0$ in EQN. 7 to maintain consistent units, and this linear transformation will not alter the trend of the EQN. 7 economic function E.

$$E(P, b) = \left[(1-w)b - \frac{wGP}{b}\right] \quad \text{(EQN. 6)}$$

$$E(P) = (1-w)\log_2\left(1 + \frac{k\alpha GP}{N_0}\right) - w\left(\frac{GP}{N_0}\right) \Big/ \log_2\left(1 + \frac{k\alpha GP}{N_0}\right) \quad \text{(EQN. 7)}$$

Figure 4:
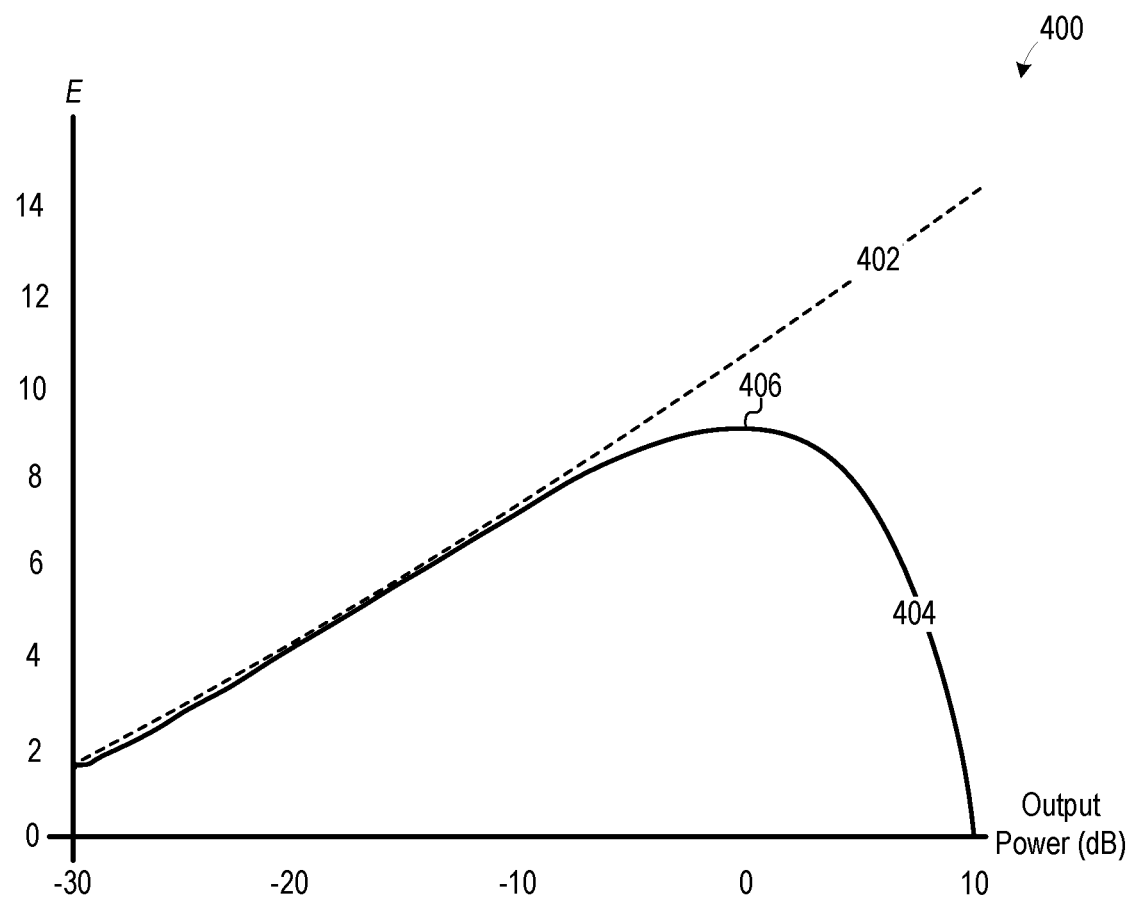
FIG. 4 is a graph of an economic value as a function of transmitter output power, according to an embodiment.

FIG. 4 is a graph 400 of economic value E, as determined from EQN. 7, as a function of transmitter 102 output power under two different scenarios where $N_o=30$, $\alpha=0.1$, and $G=20$. The first scenario, represented by curve 402, corresponds to w=0, or in other words, curve 402 corresponds to a power unrestricted scenario. Economic value E substantially parallels the traditional Shannon model in the power unrestricted scenario such that economic value E unlimitedly increases with increasing power. However, the power unrestricted scenario is not a realistic scenario in most applications, and curve 404 represents a second scenario where power is considered in the economic function by setting w=0.001. As evident from curve 404, the maximum economic value is reached at operating point 406, and this operating point therefore represents an optimal balance of spectral efficiency and energy efficiency. Economic value E rapidly drops off as power increases beyond that of operating point 406, as illustrated by the right-side portion of curve 404.

Figure 5:
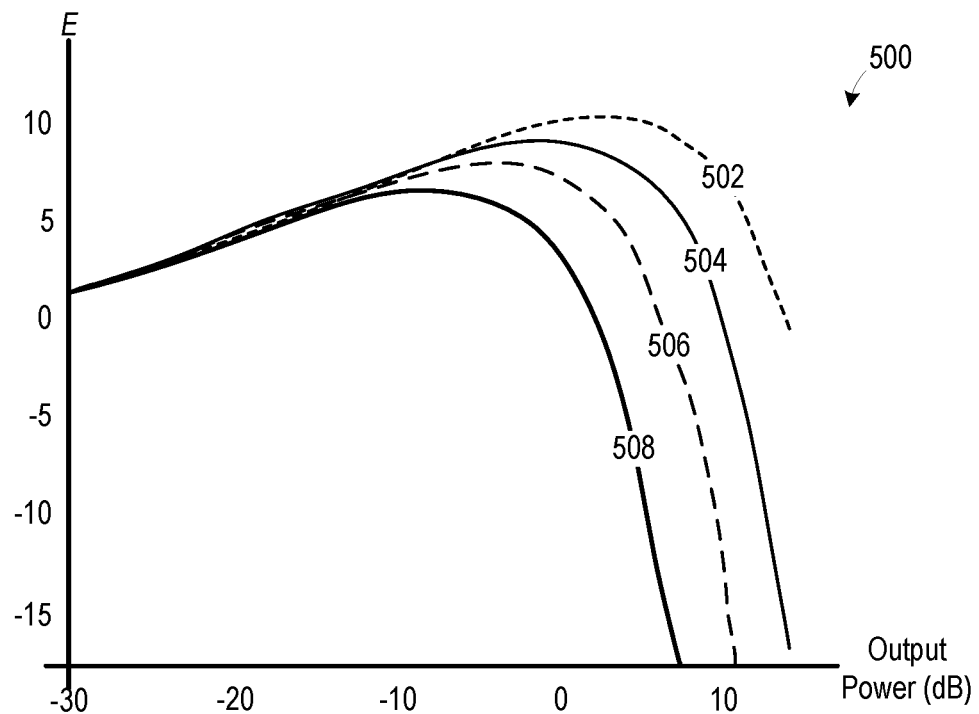
FIG. 5 is a graph of an economic value as a function of transmitter output power for four different weight values, according to an embodiment.
Figure 6:
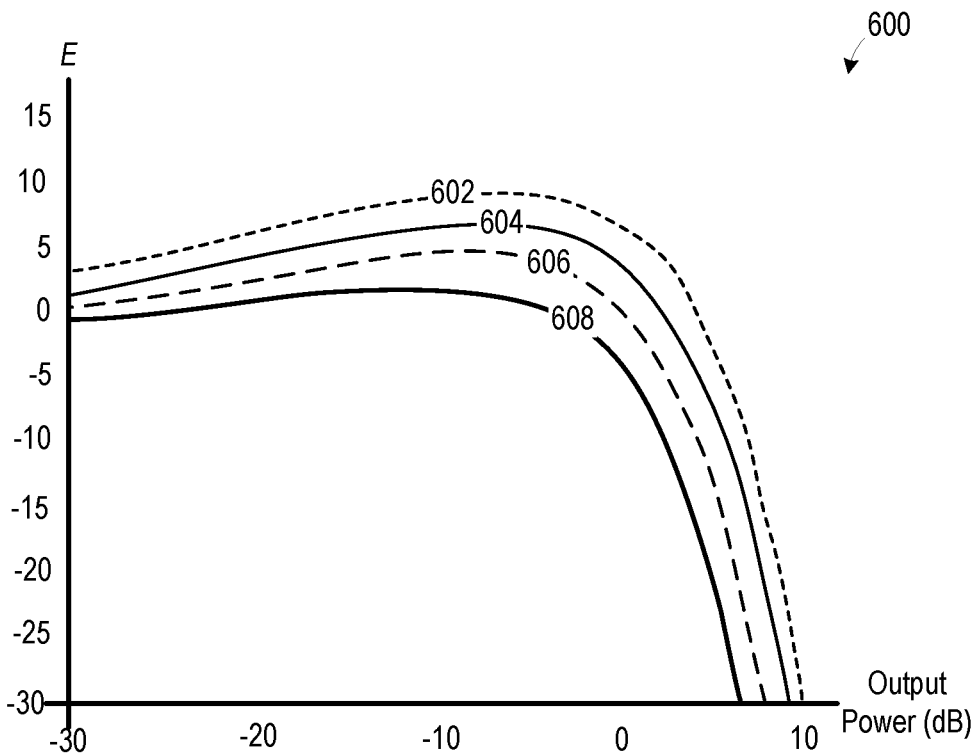
FIG. 6 is a graph of an economic value as a function of transmitter output power for four different loss function values, according to an embodiment.

FIGS. 5 and 6 illustrate examples of how changing parameters may affect the EQN. 7 economic function. FIG. 5 is a graph 500 of the EQN. 7 economic value E versus transmitter 102 output power for four different values of w where $N_0=30$, $\alpha=0.1$, and $G=20$. Curve 502 corresponds to w=0.0005, curve 504 corresponds to w=0.001, curve 506 corresponds to w=0.002, and curve 508 corresponds to w=0.004. As evident when comparing curves 502-508, as w increases, the optimal operation point is shifted towards a smaller power value. Thus, increasing w will encourage smaller transmitter 102 output power. To the contrary, reducing w encourages increasing output power to increase capacity.

FIG. 6 is a graph 600 of the EQN. 7 economic value E versus transmitter output power for four different values of α where $N_o$=30, w=0.001, and G=20. Curve 602 corresponds to α=0.4, curve 604 corresponds to α=0.1, curve 606 corresponds to α=0.025, and curve 608 corresponds to α=0.0063. Loss function a also affects optimal output power of transmitter 102. Decreasing α will suppress capability to increase the output power level, while increasing α leads to a higher optimal power level.

Accordingly, some embodiments of power modulation and management system 110 are configured to evaluate EQN. 7 to determine a combination of transmitter 102 output power, transmitter 102 modulation format, and transmitter 102 FEC rate that achieves a maximum economic value E, to thereby realize an optimum balance between spectral efficiency and energy efficiency in communication network 100 However, EQN. 7 assumes that MIPS can be continuously adjusted as required according to transmitter 102 output power. While some embodiments of communication network 100 support sufficiently high granularity in MIPS adjustment to at least approximate a continuously adjustable MIPS, other embodiments are only capable of supporting a limited number of MIPS values.

For example, some embodiments of communication network 100 are configured to operate using (a) any one of a predetermined set of implemented modulation formats, (b) any one of a predetermined set of implemented FEC rates, and/or (c) any one of a predetermined set of implemented transmitter output powers, to thereby achieve a limited number of possible MIPS values. Table 1 below illustrates one example of implemented combinations of modulation format and FEC coding rates in an embodiment of communication network 100. In this embodiment, implemented modulation formats are QPSK, 16-QAM, and 64-QAM, and implemented FEC rates are 66.70%, 80.00%, 87.50%, and 91.67%. The FEC of the Table 1 example is based on low-density parity-check (LDPC) FEC code, and FEC rate adaption is achieved, for example, by code word shorting using a common parity-check matrix. This rate adaption scheme advantageously promotes high computational efficiency and enables switching between coding rates without encoding/decoding process changes, other than zero padding. Not all FEC rates are implemented for each modulation format, and there are nine possible combinations of modulation format and FEC rate in the Table 1 example.

TABLE 1

| Modulation Format | FEC Coding Rate | Overhead Percentage | Codeword Size | Message Size | MIPS |
|---|---|---|---|---|---|
| QPSK | 66.70% | 33.3% | 9216 | 6144 | 1.333 |
| QPSK | 80.00% | 20% | 15360 | 12288 | 1.6 |
| QPSK | 87.50% | 12.5% | 24576 | 21504 | 1.75 |
| 16-QAM | 66.70% | 33.3% | 9216 | 6144 | 2.667 |
| 16-QAM | 80.00% | 20% | 15360 | 12288 | 3.2 |
| 16-QAM | 87.50% | 12.5% | 24576 | 21504 | 3.5 |

TABLE 1-continued

| Modulation Format | FEC Coding Rate | Overhead Percentage | Codeword Size | Message Size | MIPS |
|---|---|---|---|---|---|
| 64-QAM | 80.00% | 20% | 15360 | 12288 | 4.8 |
| 64-QAM | 87.50% | 12.5% | 24576 | 21504 | 5.25 |
| 64-QAM | 91.67% | 8.33% | 36864 | 33792 | 5.5 |

Figure 7:
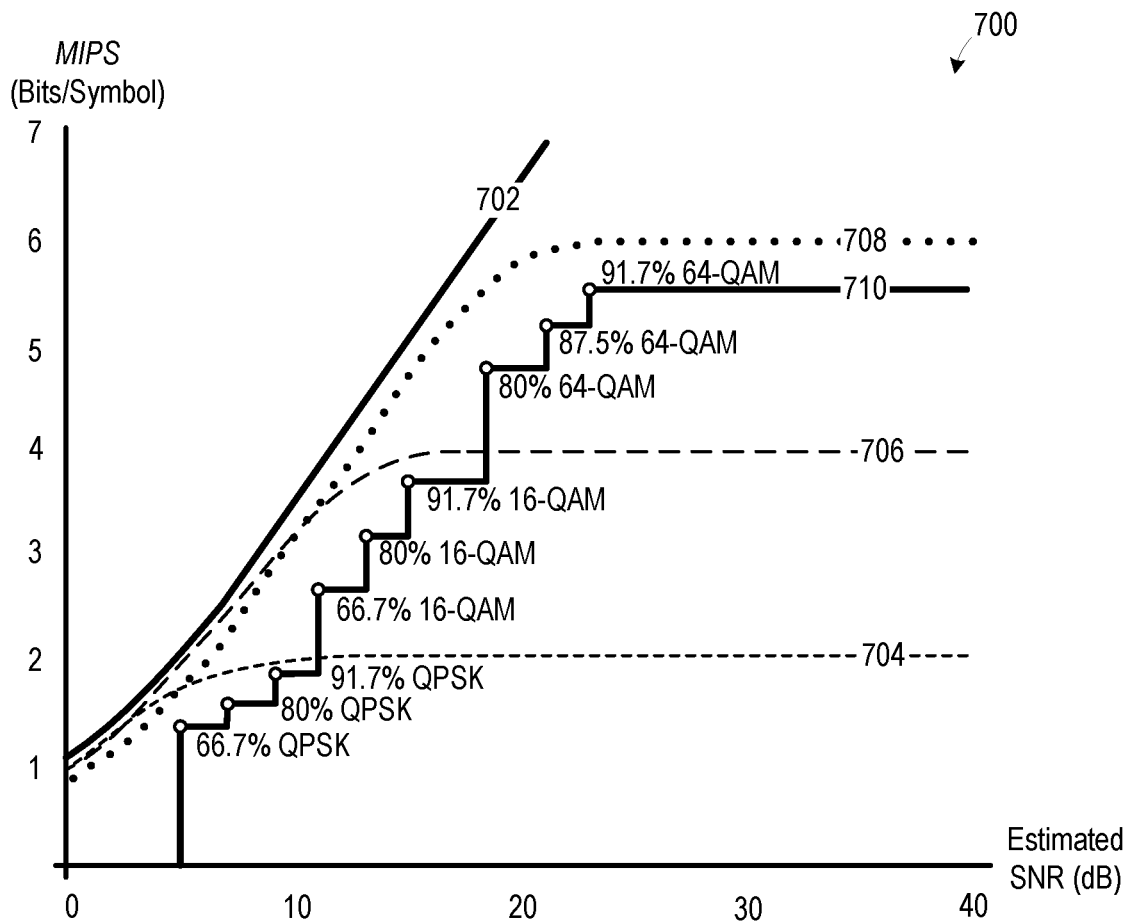
FIG. 7 is a graph of MIPS versus SNR including a curve representing possible MIPS values in a communication network implementing a limited number of combinations of modulation format and forward error correction (FEC) rates, according to an embodiment.

FIG. 7 is a graph 700 of MIPS versus SNR including curves 702, 704, 706, and 708 representing Shannon theory, QPSK modulation, 16-QAM modulation, 64-QAM modulation, respectively. Graph 700 additionally includes a stairstep curve 710 plotting the possible MIPS values from the Table 1 example in place of a monotonically increasing RLM curve. The corners of curve 710 indicate SNR threshold of difference modulation format-FEC rate candidates, and MIPS values are constant between SNR thresholds.

Figure 8:
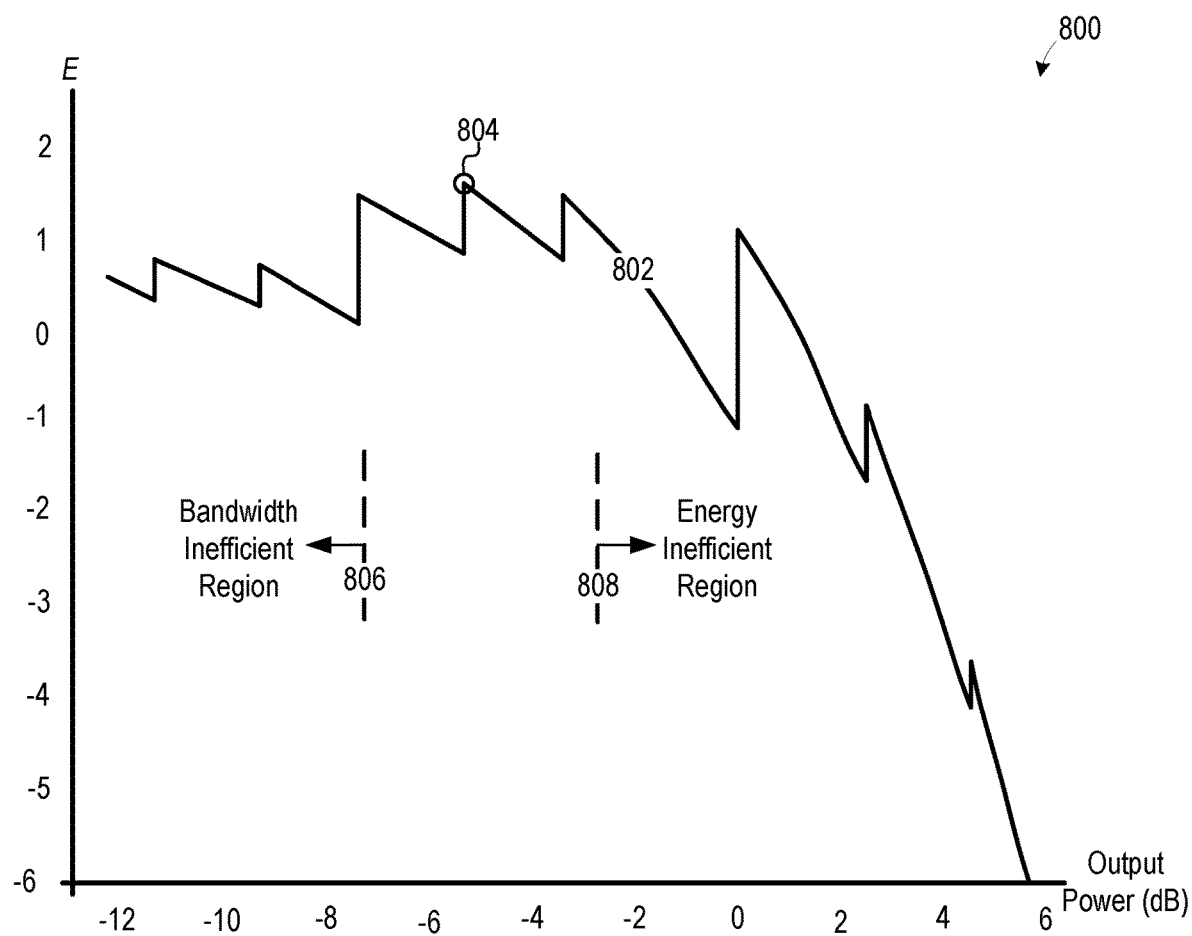
FIG. 8 is a graph of economic value as a function of transmitter output power based on a discontinuous economic function, according to an embodiment.

FIG. 8 is a graph 800 of the EQN. 6 economic value E as a function of transmitter 102 output power with b of EQN. 6 being the step function illustrated by curve 710 of FIG. 7. Economic value E, as represent by curve 802, is discontinuous with multiple spikes corresponding to different modulation format-FEC rate candidates at their SNR thresholds. Nevertheless, there is still peak economic E value at operating point 804 corresponding to 16-QAM modulation format, 80% rate FEC, and transmitter 102 output power of −5.4 dBm. In this case, operating point 804 represents a global maximum value of the economic function, although a local maximum value may be selected in some cases. The peak value of economic value E represents an optimal tradeoff between spectral efficiency and energy efficiency in the communication network 100 embodiment represented by Table 1. Operating points to the left of a vertical line 806 are bandwidth inefficient, while operating points to the right of a vertical line 808 are energy inefficient. Therefore, it is desirable that this communication network embodiment operate in the operating region between vertical lines 806 and 808. Some embodiments of power modulation and management system 110 are configured to evaluate EQN. 6, where b of EQN. 6 is a step function, to determine a combination of transmitter 102 output power, transmitter 102 modulation format, and transmitter 102 FEC rate that achieves a maximum economic value E, to realize an optimum balance between spectral efficiency and energy efficiency in communication network 100.

Figure 9A:
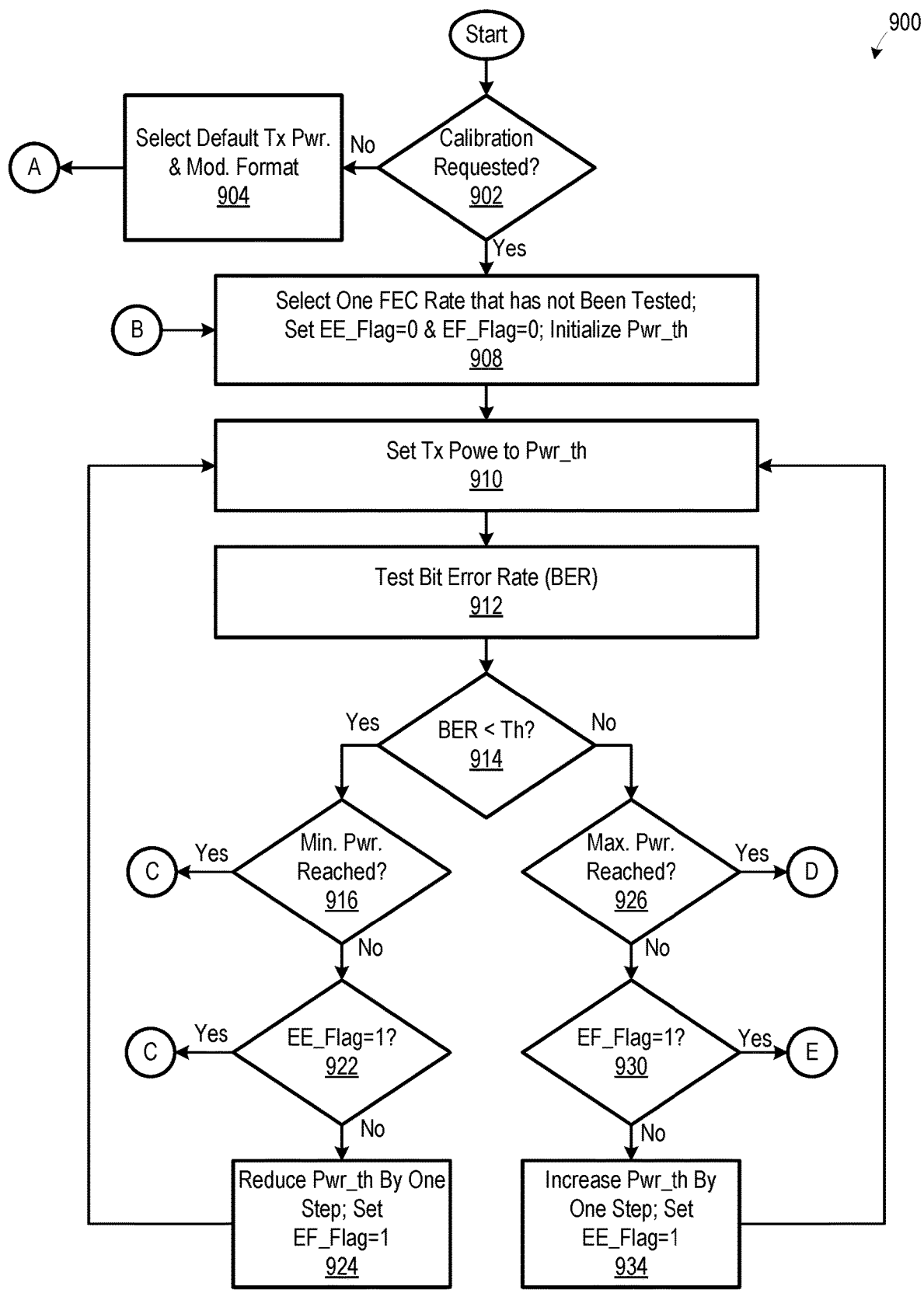
FIGS. 9A and 9B collectively illustrate a method for power and modulation management, according to an embodiment.
Figure 9B:
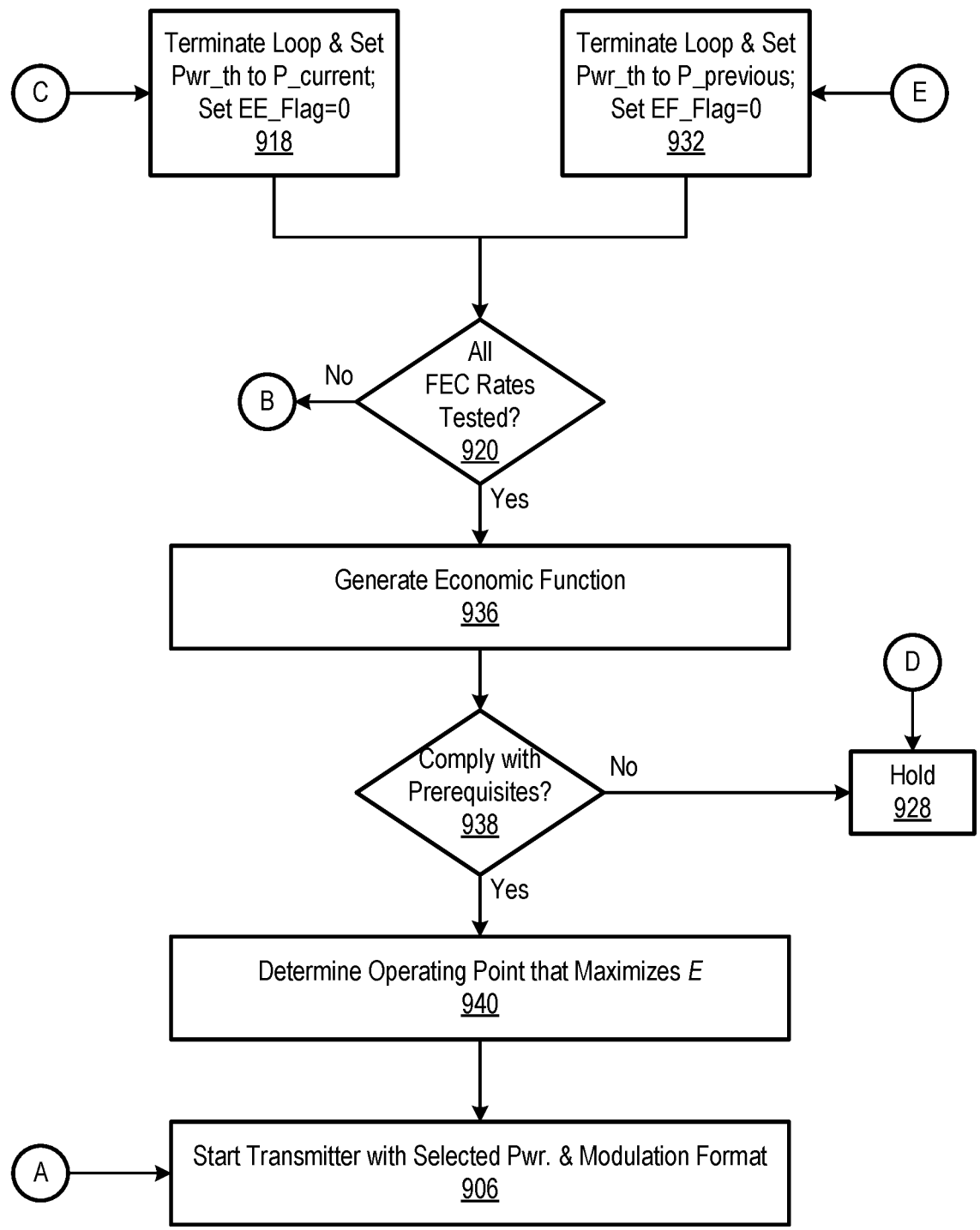

FIGS. 9A and 9B collectively illustrate a method 900 for power and modulation management. While method 900 is discussed below with respect to communication network 100 of FIG. 1, method 900 is not limited to use in communication network 100. Additionally, communication network 100 is not limited to operating according to method 900.

Decision block 902 determines wherein calibration is requested. If the result of decision block 902 is no, method 900 proceeds to block 904, wherein respective default transmitter (Tx) 102 output power and modulation format are selected. Method 900 then proceeds to block 906 where transmitter 102 is started with the selected output power and modulation format. If the result of decision block 902 is yes, method proceeds to block 908 where one FEC rate that has not been tested is selected from a set of implemented FEC rates. Additionally, flags EE_Flag and EF_Flag are each set to zero, in block 908. Furthermore, transmitter power variable Pwr_th is set to an initial value in block 908. Transmitter 102 output power is subsequently set in block 910 to Pwr_th.

Bit error rate is tested in block 912. In some embodiments, transmitter 102 transmits probe signals to receivers 104, power and modulation management system 110 receives feedback from receivers 104 via output communication signals 116, and power and modulation management system 110 determines bit error rate from output communication signals 116. In some alternate embodiments, a communication link metric other than bit error rate is determined in block 912. For example, in some alternate embodiments, method 900 determines an error vector magnitude (EVM) or quality factor (Q) value in block 912. Decision block 914 determines whether the bit error rate is less than a threshold value (Th). In some embodiments, the threshold value is $1 \times 10^{-12}$ or $1 \lambda 10^{-15}$. In alternate embodiments where method 900 determines an alternative communication link metric in block 912, such as a EVM or a Q value, decision block 914 is modified accordingly to evaluate this alternative communication link metric. If the result of decision block 914 is yes, method 900 proceeds to decision block 916 to determine if the minimum transmitter 102 output has been reached. If the result of decision block 916 is yes, method 900 proceeds to block 918, where the loop beginning with block 910 is terminated, Pwr_th is set to the current transmitter 102 output power (P_current), and flag EE_Flag is set to zero. Method 900 then proceeds to decision block 920 (discussed below).

Referring again to decision block 916, is the result of the decision block is no, method 900 proceeds to decision block 922 to determine if flag EE_Flag is equal to one. If the result of decision block 922 is yes, method proceed to block 918 (discussed above). If the result of decision block 922 is no, method 900 proceeds to block 924 where Pwr_th is reduced by one step and flag EF_Flag is set to one. Method 900 then returns to block 910.

Referring again to decision block 914, if the result of decision block 914 is no, method 900 proceeds to decision block 926 to determine if maximum transmitter 102 output power has been reached. If the result of decision block 926 is yes, method 900 proceeds to block 928 where it is determined that calibration cannot be performed and the calibration procedure is therefore put on hold. If the result of decision block 926 is no, method 900 proceeds to decision block 930 block and determines whether flag EF_Flag is equal to one. If the result of decision block 930 is yes, method 900 proceeds to block 932 where the loop beginning with block 910 is terminated, Pwr_th is set to the previous transmitter 102 output power (P_previous), and flag EF_Flag is set to zero. Method 900 proceeds from block 932 to decision block 920 (discussed below). Referring again to decision block 930, if the result of the decision block is no, method 900 proceeds to block 934 where Pwr_th is increased by one step and Flag EE_Flag is set to one. Method 900 then returns to block 910.

Decision block 920 determines whether all implemented FEC rates have been tested. If the result of decision block 920 is no, method 900 returns to block 908. If the result of decision block 920 is yes, method 900 proceeds to block 936 where an economic function is generated. The economic function is generated, for example, based on one of EQNS. 4, 6, or 7. Method 900 proceeds from block 936 to decision block 938 and determines whether any of the possible operating points of the economic function comply with operating prerequisites of communication network 100, such as maximum permissible transceiver power, maximum transceiver MIPS value, and/or maximum total communication network 100 power. If the result of decision block 938 is no, method 900 proceeds to block 928 (discussed above).

If the result of decision block 938 is yes, method 900 proceeds to block 940 and determines an operating point that maximizes a value of the economic function. The operating point determined in block 940 includes, for example, a selected power and modulation format. Method 900 proceeds to block 906 where transmitter 102 is started at the selected output power and modulation format.

Method 900 assumes that each receiver is independently operated. However, in some embodiments, global constraints, such as maximum communication network power, may require consideration of how operation of one receiver impacts operation of other receivers. In these embodiments, method 900 may be modified accordingly such as using a bit-loading algorithm based on water-filling principles.

Referring again to FIG. 1, in some embodiments, power and modulation management system 110 is formed of analog and/or digital electronic circuitry. For example, some embodiments of power and modulation management system 110 are at least partially implemented by one or more processors executing instructions, such as in the form of software and/or firmware, stored in one or more information stores. Although power and modulation management system 110 is depicted as being a discrete element, it may be integrated with, or it may share one or more elements with, at least one other element of communication network 100. Additionally, power and modulation management system 100 could be formed of multiple constituent subsystems which need not be collocated.

Figure 10:
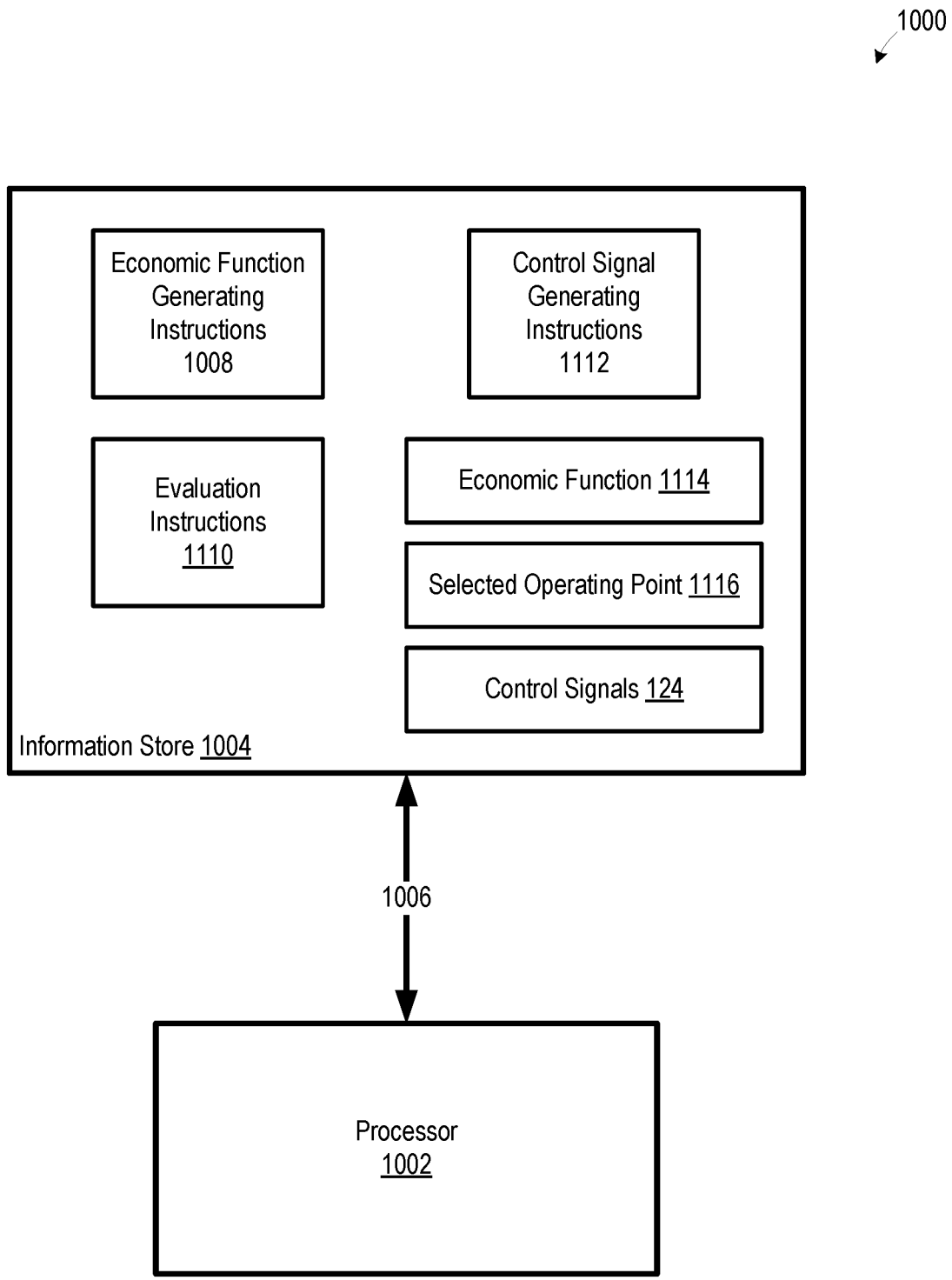
FIG. 10 is a block diagram of a power and modulation management system, according to an embodiment.

FIG. 10 is a block diagram of a power and modulation management system 1000, which is one embodiment of power and modulation management system 110 that is implemented by a processor configured to execute instructions stored in an information store. Power and modulation management system 1000 includes a processor 1002 and an information store 1004. Processor 1002 is communicatively coupled to information store 1004, as by symbolically shown by an arrow 1006. Although processor 1002 and information store 1004 are depicted as being separate elements, processor 1002 and information store 1004 could be partially or fully combined without departing from the scope hereof. Additionally, processor 1002 and/or information store 1004 could be partially or fully implemented in a distributed computing environment, such as in a cloud computing environment. Information store 1004 includes economic function generating instructions 1008, evaluation instructions 1110, and control signal generating instructions 1112. Economic function generating instructions 1008 are configured to generate an economic function 1114, such as based on one or more of EQNS. 4, 6, and 7. Evaluation instructions 1110 are configured to evaluate economic function 1114 to determine a selected operating point 1116 which at least substantially maximizes a value of economic function 1114, subject to an applicable constraints of communication network 1000. Control signal generating instructions 1112 are configured to generate control signals 124 to cause transmitter 102 to operate at selected operating point 1116.

Discussed below with respect to FIGS. 11-14 are several alternate embodiments of communication network 100 having a point-to-point, instead of a point-to-multipoint, network topology. It is understood, however, that communication network 100 could be modified to have other topologies without departing from the scope hereof.

Figure 11:
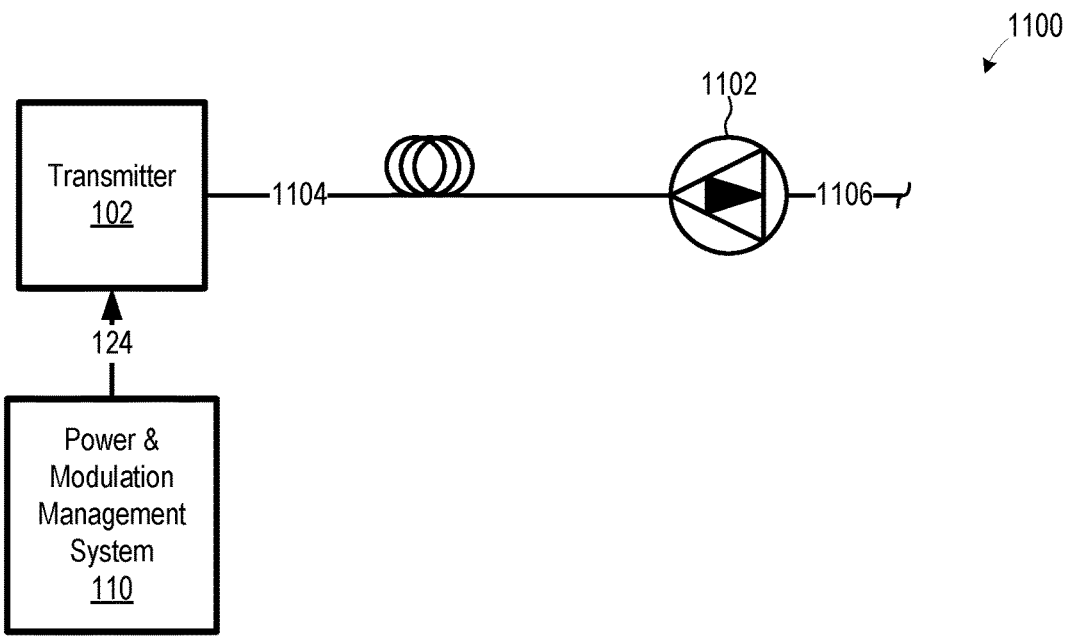
FIG. 11 is a block diagram of a communication network including a fiber node and an instance of the power and modulation management system of FIG. 1, according to an embodiment.

FIG. 11 is a block diagram of a communication network 1100 including an instance of transmitter 102, an instance of power and modulation management system 110, a fiber node 1102, an optical cable 1104, and one or more electrical cables 1106. Optical cable 1104 communicatively couples transmitter 102 to fiber node 1102, and fiber node 1102 serves as a receiver for transmitter 102. Fiber node 1102 is configured to convert optical signals on optical cable 1104 to electrical signals on one or more electrical cables 1106. Electrical cables 1106 include, for example, one or more coaxial electrical cables or twisted pair electrical cables (e.g., Ethernet cables or telephone cables). In some embodiments, fiber node 1102 is a cable fiber node, a telecommunications remote terminal, an ONU, or an optical network termination ONT.

Figure 12:
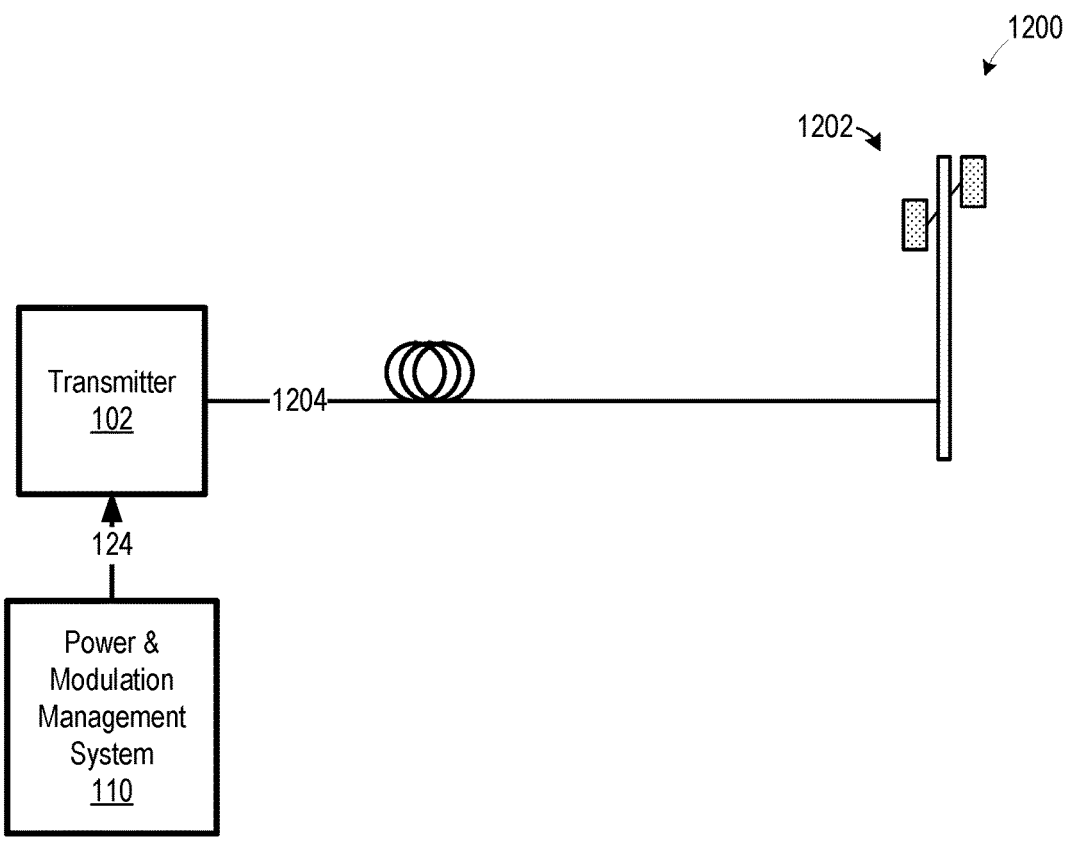
FIG. 12 is a block diagram of a communication network including a wireless base station and an instance of the power and modulation management system of FIG. 1, according to an embodiment.

FIG. 12 is a block diagram of a communication network 1200 including an instance of transmitter 102, an instance of power and modulation management system 110, a wireless base station 1202, and an optical cable 1204. Optical cable 1204 communicatively couples transmitter 102 to wireless base station 1202, and wireless base station 1202 serves as a receiver for transmitter 102. Wireless base station 1202 includes, for example, a third generation (3G) cellular wireless base station, a fourth generation (4G) cellular wireless base station, a fifth generation (5G) cellular wireless base station, a sixth generation (6G) cellular wireless base station, and/or a Wi-Fi wireless base station. In some embodiments, optical cable 1204 serves as one or more of backhaul for wireless base station 1202, a midhaul for wireless base station 1202, or a fronthaul for wireless base station 1202.

Figure 13:
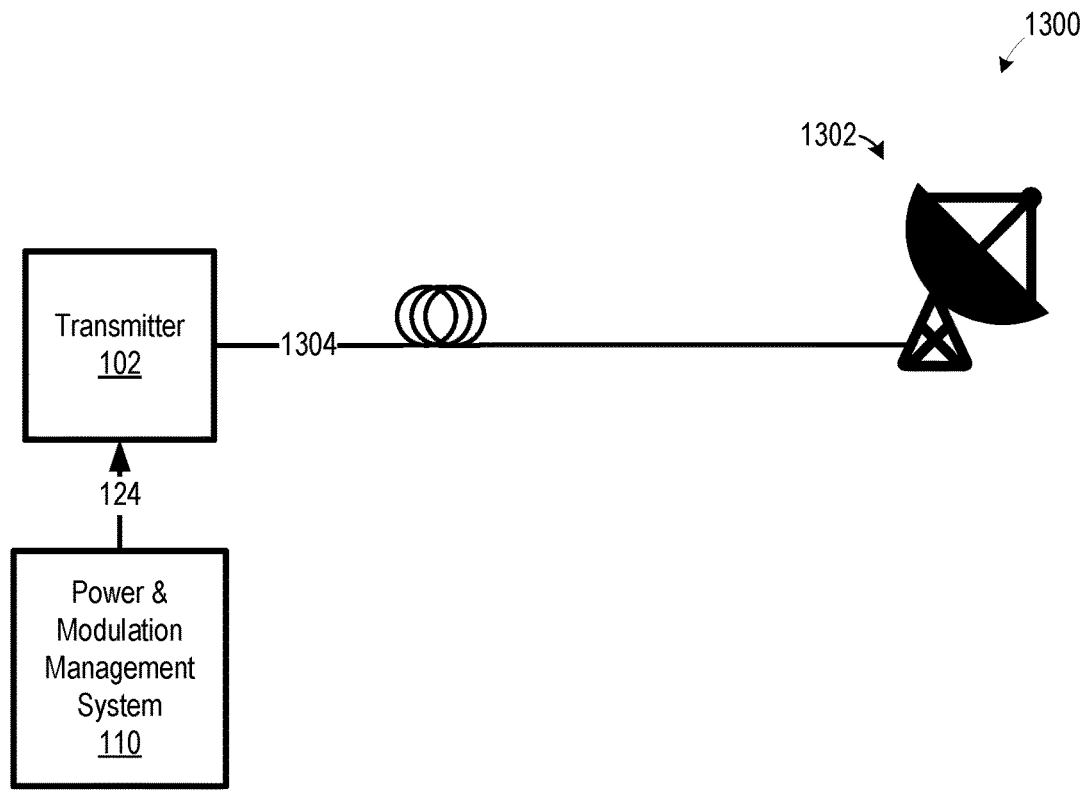
FIG. 13 is a block diagram of a communication network including a satellite ground station and an instance of the power and modulation management system of FIG. 1, according to an embodiment.

FIG. 13 is a block diagram of a communication network 1300 including an instance of transmitter 102, an instance of power and modulation management system 110, a satellite ground station 1302, and an optical cable 1304. Optical cable 1304 communicatively couples transmitter 102 to satellite ground station 1302, and satellite ground station 1302 serves as a receiver for transmitter 102.

Figure 14:
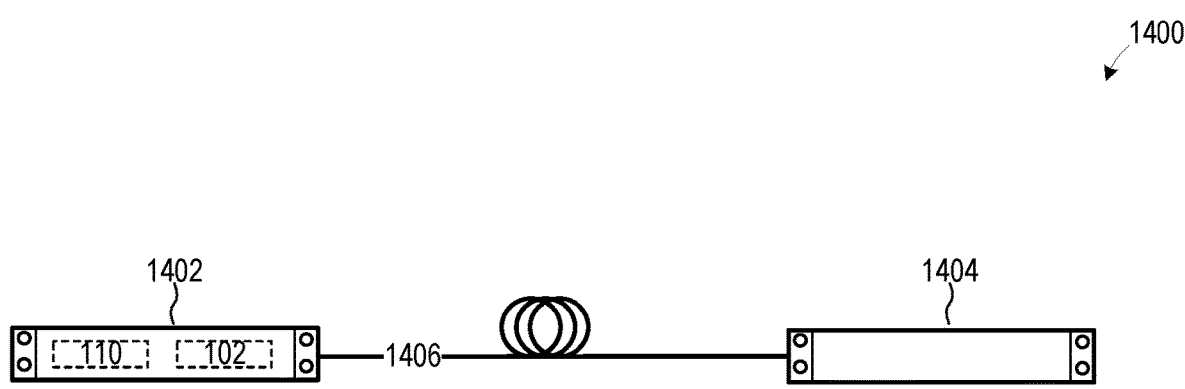
FIG. 14 is a block diagram of a communication network including a server and an instance of the power and modulation management system of FIG. 1, according to an embodiment.

FIG. 14 is a block diagram of a communication network 1400 including a server 1402, a server 1404, and an optical cable 1406. Server 1402 include an instance of transmitter 102 and power and modulation management system 110. Optical cable 1406 communicatively couples transmitter 102 to server 1404, and server 1404 serves as a receiver for transmitter 102. Communication network 1400, is for example, a communication network in a data center and/or a communication network in a hyperscale computing environment.

Figure 15:
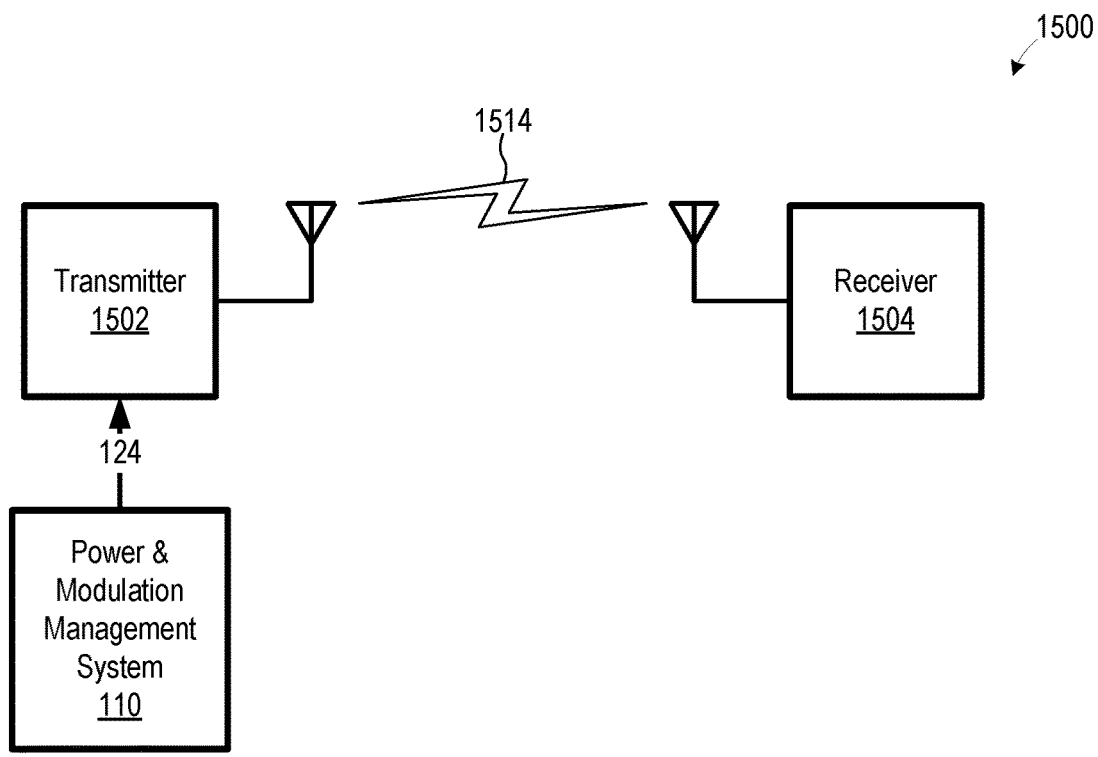
FIG. 15 is a block diagram of an alternate embodiment of the FIG. 1 communication network configured to transmit data in a wireless domain.
Figure 16:
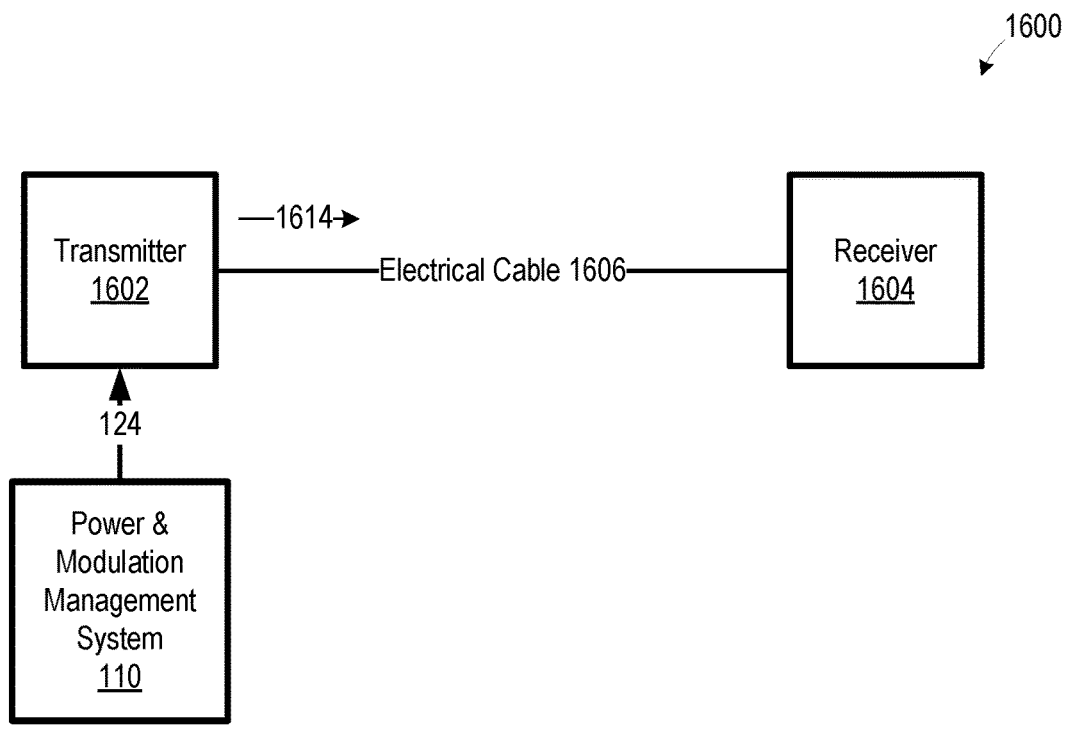
FIG. 16 is a block diagram of an alternate embodiment of the FIG. 1 communication network configured to transmit data in an electrical domain.

Discussed below with respect to FIGS. 15 and 16 are alternate embodiments of communication network 100 operating in a wireless domain and in an electrical domain, respectively. It is understood, however, that communication network 100 could be modified in other manners to operate in a wireless domain and/or an electrical domain.

FIG. 15 is a block diagram of a communication network 1500 including a transmitter 1502, an instance of power and modulation management system 110, and a receiver 1504. Transmitter 1502 is similar to transmitter 102 of FIG. 1, but transmitter 1502 is configured to generate transmission communication signals 1514 in a wireless domain, instead of in an optical domain. Receiver 1504 is analogous to a receiver 104 of FIG. 1.

FIG. 16 is a block diagram of a communication network 1600 including a transmitter 1602, an instance of power and modulation management system 110, a receiver 1604, and an electrical cable 1606. Electrical cable 1606 communicatively couples transmitter 1602 and receiver 1604, and electrical cable 1606 includes, for example, a coaxial electrical cable or a twisted-pair electrical cable (e.g., an Ethernet electrical cable or a telephone electrical cable). Transmitter 1602 is similar to transmitter 102 of FIG. 1, but transmitter 1602 is configured to generate transmission communication signals 1614 in an electrical domain, instead of in an optical domain. Receiver 1604 is analogous to a receiver 104 of FIG. 1.

Alternate Economic Functions

Power modulation management system 110 may be modified to evaluate an economic function that is different from the economic functions discussed above. For example, EQN. 4 above may be modified to consider latency, data transmission cost, and/or one or more other parameters, in place of, or in addition to, spectral efficiency and energy consumption. For example, one alternate embodiment of EQN. 4 includes a summation term for latency, as well as the summation terms for spectral efficiency and energy consumption. Accordingly, a maximum value of this alternate economic function represents an optimal balance between spectral efficiency, energy efficiency, and low latency. As another example, another alternate embodiment of EQN. 4 includes a transmission cost summation term in place of the energy consumption summation term, such that a maximum value of this alternate economic function represents an optimal balance between spectral efficiency and low transmission cost.

Combinations of Features

Features described above may be combined in various ways without departing from the scope hereof. The following examples illustrate some possible combinations.

(A1) A method for automatic power and modulation management in a communication network includes (1) generating a management function of at least (a) mutual information per symbol (MIPS) of the communication network and (b) output power (P) of a transmitter of the communication network, (2) determining a selected MIPS value and a selected P value which achieve a maximum value of the management function, and (3) causing the transmitter of the communication network to operate according to the selected MIPS value and the selected P value.

(A2) In the method denoted as (A1), causing the transmitter to operate according to the selected MIPS value and the selected P value may include causing the transmitter to operate according to a modulation format and a forward error correction (FEC) rate which collectively achieve the selected MIPS value.

(A3) In any one of the methods denoted as (A1) and (A2), determining the selected MIPS value and the selected P value which achieve the maximum value of the management function may include selecting one modulation format from a predetermined set of implemented modulation formats.

(A4) In any one of the methods denoted as (A1) through (A3), determining the selected MIPS value and the selected P value which achieve the maximum value of the management function may include selecting one forward error correction (FEC) rate from a predetermined set of implemented FEC rates.

(A5) The method denoted as (A4) may further include, before determining the selected MIPS value and the selected P value, determining the predetermined set of implemented FEC rates.

(A6) In the method denoted as (A5), determining the predetermined set of implemented FEC rates may include identifying FEC rates that achieve a bit error rate that is less than a predetermined threshold value.

(A7) In the method denoted as (A5), determining the predetermined set of implemented FEC rates may include identifying FEC rates that achieve one of (a) an error vector magnitude (EVM) that is less than a first predetermined threshold value and (b) a quality factor (Q) value that is at least a predetermined second threshold value.

(A8) In any one of the methods denoted as (A1) through (A7), determining the selected MIPS value and the selected P value which achieve the maximum value of the management function may include determining the selected MIPS value and the selected P value according to one or more of the following constraints: (a) a maximum permissible MIPS value, (b) a maximum permissible transceiver power, and (c) a maximum permissible total communication network power.

(A9) In any one of the methods denoted as (A1) through (A8), the management function may have a plurality of possible discrete values, and the maximum value of the management function may be a maximum value of the plurality of possible discrete values.

(A10) In the method denoted as (A9), the maximum value may be a global maximum value.

(A11) In the method denoted as (A9), the maximum value is a local maximum value.

(A12) In any one of the methods denoted as (A1) through (A11), the communication network may be a coherent optical communication network.

(A13) In any one of the methods denoted as (A1) through (A12), the management function may be a weighted function of at least (a) mutual information per symbol (MIPS) of the communication network and (b) output power (P) of a transmitter of the communication network.

(B1) A method for automatic power and modulation management in a communication network includes (1) generating a discontinuous management function that is a weighted function of at least spectral efficiency and power consumption of the communication network, (2) determining, from the discontinuous management function, an optimal modulation format, an optimal forward error correction (FEC) rate, and an optimal output power of a transmitter of the communication network, which collectively achieve a maximum value of the management function, and (3) causing the transmitter to operate according to the optimal modulation format, the optimal FEC rate, and the optimal output power.

(B2) In the method denoted as (B1), determining the optimal modulation format may include selecting the optimal modulation format from a predetermined set of implemented modulation formats.

(B3) In any one of the methods denoted as (B1) and (B2), determining the optimal FEC rate may include selecting the optimal FEC rate from a predetermined set of implemented FEC rates.

(B4) The method denoted as (B3) may further include generating the predetermined set of implemented FEC rates.

(B5) In the method denoted as (B4), generating the predetermined set of implemented FEC rates may include one of (a) identifying FEC rates that achieve a bit error rate that is less than a predetermined first threshold value, (b) identifying FEC rates that achieve an error vector magnitude (EVM) that is less than a predetermined second threshold value, and (c) identifying FEC rates that achieve a quality factor (Q) value that is at least a predetermined third threshold value.

(B6) In any one of the methods denoted as (B1) through (B5), determining the optimal output power may include selecting the optimal output power from a predetermined set of implemented output powers.

(B7) In any one of the methods denoted as (B1) through (B6), determining the optimal output power may include selecting the optimal output power so that a maximum permissible transceiver power is not exceeded.

(B8) In any one of the methods denoted as (B1) through (B7), determining the optimal output power may include selecting the optimal output power so that a maximum permissible total communication network power is not exceeded.

(B9) In any one of the methods denoted as (B1) through (B8), the communication network may be a coherent optical communication network.

(B10) In any one of the methods denoted as (B1) through (B9), the optimal modulation format may include a quadrature phase shift keying (QPSK) modulation format or a quadrature amplitude modulation (QAM) modulation format.

(B11) In any one of the methods denoted as (B1) through (B9), the optimal modulation format may include a probabilistically-shaped quadrature amplitude modulation (QAM) modulation format or a geometrically-shaped QAM modulation format.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for automatic power and modulation management in a communication network, comprising:
    generating a management function of at least (a) mutual information per symbol (MIPS) of the communication network and (b) output power (P) of a transmitter of the communication network;
    determining a selected MIPS value and a selected P value which achieve a maximum value of the management function; and
    causing the transmitter of the communication network to operate according to the selected MIPS value and the selected P value,
    wherein the communication network includes one or more of a cellular wireless communication network, a Wi-Fi wireless communication network, a satellite wireless communication network, a cable communication network, a digital subscriber line communication network, a data center communication network, a hyperscale computing environment communication network, an Ethernet communication network, and a free space optical communication network.

2. The method of claim 1, wherein causing the transmitter to operate according to the selected MIPS value and the selected P value comprises causing the transmitter to operate according to a modulation format and a forward error correction (FEC) rate which collectively achieve the selected MIPS value.

3. The method of claim 1, wherein determining the selected MIPS value and the selected P value which achieve the maximum value of the management function comprises selecting one modulation format from a predetermined set of implemented modulation formats.

4. The method of claim 1, wherein determining the selected MIPS value and the selected P value which achieve the maximum value of the management function comprises selecting one forward error correction (FEC) rate from a predetermined set of implemented FEC rates.

5. The method of claim 4, further comprising, before determining the selected MIPS value and the selected P value, determining the predetermined set of implemented FEC rates.

6. The method of claim 5, wherein determining the predetermined set of implemented FEC rates comprises identifying FEC rates that achieve a bit error rate that is less than a predetermined threshold value.

7. The method of claim 5, wherein determining the predetermined set of implemented FEC rates comprises identifying FEC rates that achieve one of (a) an error vector magnitude (EVM) that is less than a first predetermined threshold value and (b) a quality factor (Q) value that is at least a predetermined second threshold value.

8. The method of claim 1, wherein determining the selected MIPS value and the selected P value which achieve the maximum value of the management function comprises determining the selected MIPS value and the selected P value according to one or more of the following constraints: (a) a maximum permissible MIPS value, (b) a maximum permissible transceiver power, and (c) a maximum permissible total communication network power.

9. The method of claim 1, wherein:
the management function has a plurality of possible discrete values; and
the maximum value of the management function is a maximum value of the plurality of possible discrete values.

10. The method of claim 1, wherein the maximum value is a global maximum value.

11. The method of claim 1, wherein the maximum value is a local maximum value.

12. The method of claim 1, wherein the communication network further includes a coherent optical communication network.

13. The method of claim 1, wherein the management function is a weighted function of at least (a) MIPS of the communication network and (b) P of the transmitter of the communication network.

14. A method for automatic power and modulation management in a data center, comprising:
generating a management function of at least (a) mutual information per symbol (MIPS) of the data center and (b) output power (P) of a transmitter of the data center;
determining a selected MIPS value and a selected P value which achieve a maximum value of the management function;
causing the transmitter of the data center to operate according to the selected MIPS value and the selected P value; and
transmitting communication signals from the transmitter of the data center to one or more receivers of the data center.

15. The method of claim 14, wherein causing the transmitter of the data center to operate according to the selected MIPS value and the selected P value comprises causing the transmitter to operate according to a modulation format and a forward error correction (FEC) rate which collectively achieve the selected MIPS value.

16. The method of claim 14, wherein determining the selected MIPS value and the selected P value which achieve the maximum value of the management function comprises selecting one modulation format from a predetermined set of implemented modulation formats.

17. The method of claim 14, wherein determining the selected MIPS value and the selected P value which achieve the maximum value of the management function comprises selecting one forward error correction (FEC) rate from a predetermined set of implemented FEC rates.

18. A method for automatic power and modulation management in a hyperscale computing environment, comprising:
generating a management function of at least (a) mutual information per symbol (MIPS) of the hyperscale computing environment and (b) output power (P) of a transmitter of the hyperscale computing environment;
determining a selected MIPS value and a selected P value which achieve a maximum value of the management function;
causing the transmitter of the hyperscale computing environment to operate according to the selected MIPS value and the selected P value; and
transmitting communication signals from the transmitter of the hyperscale computing environment to one or more receivers of the hyperscale computing environment.

19. The method of claim 18, wherein causing the transmitter of the hyperscale computing environment to operate according to the selected MIPS value and the selected P value comprises causing the transmitter of hyperscale computing environment to operate according to a modulation format and a forward error correction (FEC) rate which collectively achieve the selected MIPS value.

20. The method of claim 18, wherein:
the management function has a plurality of possible discrete values; and
the maximum value of the management function is a maximum value of the plurality of possible discrete values.

* * * * *